(12) United States Patent
Sato

(10) Patent No.: US 11,106,097 B2
(45) Date of Patent: Aug. 31, 2021

(54) LIQUID CRYSTAL DISPLAY APPARATUS

(71) Applicant: Japan Display Inc., Minato-ku (JP)

(72) Inventor: Yuji Sato, Fukaya (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/425,268

(22) Filed: May 29, 2019

(65) Prior Publication Data

US 2019/0278143 A1 Sep. 12, 2019

Related U.S. Application Data

(63) Continuation of application No. 15/003,555, filed on Jan. 21, 2016, now Pat. No. 10,345,654, which is a
(Continued)

(30) Foreign Application Priority Data

Aug. 9, 2011 (JP) .................................. 2011-174114

(51) Int. Cl.
*G02F 1/1343* (2006.01)
*G02F 1/1333* (2006.01)
(Continued)

(52) U.S. Cl.
CPC ...... *G02F 1/134309* (2013.01); *G02F 1/1337* (2013.01); *G02F 1/134363* (2013.01);
(Continued)

(58) Field of Classification Search
CPC ......... G02F 1/136204; G02F 1/134309; G02F 1/1345; G02F 1/13452; G02F 1/13454;
(Continued)

(56) References Cited

U.S. PATENT DOCUMENTS 6,266,116 B1 7/2001 Ohta et al.
2001/0010575 A1 8/2001 Yoshida et al.
(Continued)

FOREIGN PATENT DOCUMENTS

JP 6-222397 8/1994
JP 7-159807 6/1995
(Continued)

OTHER PUBLICATIONS

Japanese Office Action dated Jun. 25, 2013, in Japan Patent Application No. 2011-174114 (with English Translation).

*Primary Examiner* — Angela K Davison
(74) *Attorney, Agent, or Firm* — Oblon, McClelland, Maier & Neustadt, L.L.P.

(57) ABSTRACT

According to one embodiment, a liquid crystal display apparatus includes a first substrate, a second substrate and a liquid crystal layer. The first substrate includes a gate wiring, a source wiring, an insulating film, a shield electrode, a primary pixel electrode, a peripheral wiring and a peripheral connecting electrode. The shield electrode is opposite to at least a portion of the gate wiring and the source wiring. The peripheral connecting electrode electrically connects the shield electrode and the peripheral wiring. The second substrate includes a pair of primary common electrodes.

16 Claims, 7 Drawing Sheets

Related U.S. Application Data continuation of application No. 13/567,560, filed on Aug. 6, 2012, now Pat. No. 9,274,386.

(51) Int. Cl.
*G02F 1/1362* (2006.01)
*G02F 1/1337* (2006.01)

(52) U.S. Cl.
CPC .. *G02F 1/133388* (2021.01); *G02F 1/133738* (2021.01); *G02F 1/134381* (2021.01); *G02F 1/136218* (2021.01); *G02F 2201/121* (2013.01); *G09G 2300/0426* (2013.01)

(58) Field of Classification Search
CPC ........ G02F 2001/136218; G02F 2001/134381; G02F 2001/133388; G02F 2201/503; G02F 2202/22; G09G 2300/043; G09G 2300/0426; H01L 23/60
See application file for complete search history.

(56) References Cited

U.S. PATENT DOCUMENTS

| | | | |
|---|---|---|---|
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0008263 A1 | 1/2007 | Kim | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2008/0297714 A1 | 12/2008 | Yanagawa et al. | |
| 2009/0058774 A1 | 3/2009 | Tang | |
| 2009/0231534 A1 | 9/2009 | Morita | |
| 2010/0002180 A1* | 1/2010 | Kim | G02F 1/13458 349/143 |
| 2010/0079694 A1 | 4/2010 | Yoshida | |
| 2010/0128208 A1 | 5/2010 | Kurasawa | |
| 2010/0157226 A1 | 6/2010 | Sakurai | |
| 2010/0188623 A1* | 7/2010 | Nakagawa | G02F 1/133753 349/96 |
| 2010/0214502 A1 | 8/2010 | Lee | |
| 2011/0234964 A1* | 9/2011 | Moriwaki | G02F 1/13458 349/149 |
| 2012/0062451 A1* | 3/2012 | Morishita | G02F 1/134363 345/87 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2004-12731 | 1/2004 |
| JP | 2004-302448 | 10/2004 |
| JP | 2005-3802 | 1/2005 |
| JP | 3644653 | 2/2005 |
| JP | 2005-242307 | 9/2005 |
| JP | 2009-69332 | 4/2009 |
| JP | 2009-109657 | 5/2009 |
| JP | 2009-192822 | 8/2009 |

* cited by examiner

LIQUID CRYSTAL DISPLAY APPARATUS

CROSS-REFERENCE TO RELATED APPLICATIONS

This application is a continuation of U.S. application Ser. No. 15/003,555 filed Jan. 21, 2016, which is a continuation of U.S. application Ser. No. 13/567,560 filed Aug. 6, 2012, and is based upon and claims the benefit of priority from Japanese Patent Application No. 2011-174114, filed Aug. 9, 2011, the entire contents of each of which are incorporated herein by reference.

FIELD

Embodiments described herein relate generally to a liquid crystal display apparatus.

BACKGROUND

Currently, the development of planar display apparatuses is being actively pursued and, of the various technologies applicable, liquid crystal displays are attracting great attention because of their advantages of being light, thin, and energy-efficient. Particularly in active matrix liquid crystal displays, in which a switching element is integrated in each pixel, attention is focusing on a structure in which a transverse electric field (including a fringe electric field) such as an in-plane switching (IPS) mode or a fringe field switching (FFS) mode is used. A liquid crystal display with such a transverse electric field mode includes a pixel electrode and a counterelectrode formed on an array substrate and switches liquid crystal molecules by a transverse electric field substantially parallel to the principal plane of the array substrate.

In contrast, there is also proposed a technology that switches liquid crystal molecules by producing a transverse or an oblique electric field between a pixel electrode formed on an array substrate and a common electrode formed on a countersubstrate.

DETAILED DESCRIPTION

Figure 1:
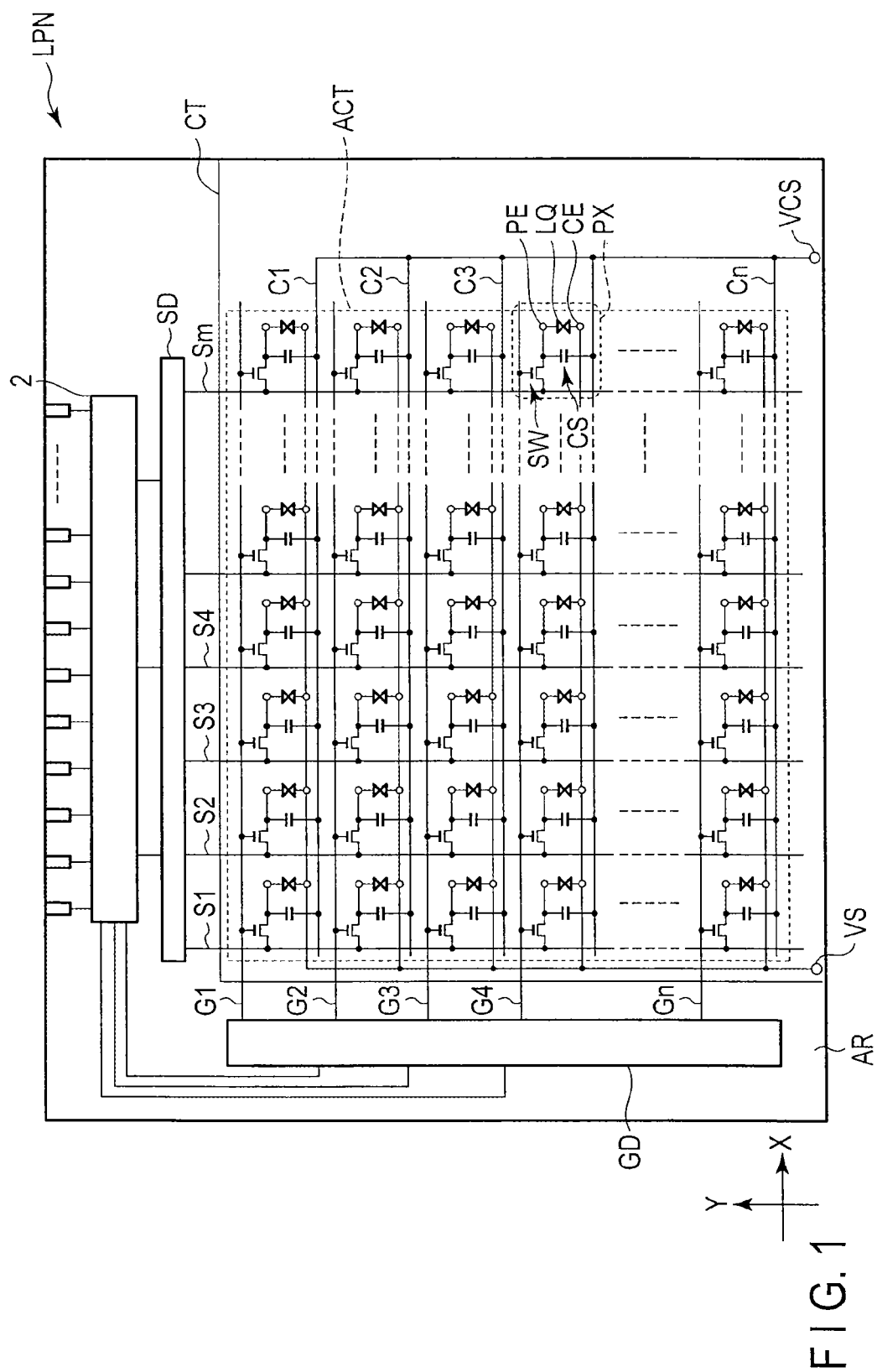
FIG. 1 is a diagram schematically showing a configuration of a liquid crystal display apparatus according to an embodiment and an equivalent circuit thereof.

In general, according to one embodiment, there is provided a liquid crystal display apparatus comprising: a first substrate, a second substrate, and a liquid crystal layer. The first substrate includes a gate wiring located in a display area and configured to extend in a first direction, a source wiring located in a display area and configured to extend in a second direction orthogonal to the first direction, an insulating film provided on the gate wiring and the source wiring, a shield electrode provided on the insulating film and opposite to at least a portion of the gate wiring and the source wiring, a primary pixel electrode located in the display area, provided on the insulating film, positioned with an interval from the shield electrode, and configured to extend in the second direction, a peripheral wiring located in a non-display area outside the display area, and a peripheral connecting electrode electrically connecting the shield electrode and the peripheral wiring. The second substrate includes a pair of primary common electrodes located in the display area, positioned across the primary pixel electrode in the first direction and configured to extend in the second direction. The liquid crystal layer is held between the first substrate and the second substrate.

According to another embodiment, there is provided a liquid crystal display apparatus comprising: a first substrate, a second substrate, and a liquid crystal layer. The first substrate includes a gate wiring configured to extend in a first direction, a source wiring configured to extend in a second direction orthogonal to the first direction, an insulating film provided on the gate wiring and the source wiring, a shield electrode provided on the insulating film and opposite to at least a portion of the gate wiring and the source wiring, a primary pixel electrode provided on the insulating film, positioned with an interval from the shield electrode, and configured to extend in the second direction, a peripheral wiring provided in the same layer as the source wiring, and a peripheral connecting electrode electrically connecting the shield electrode and the peripheral wiring. The second substrate includes a pair of primary common electrodes positioned across the primary pixel electrode in the first direction and configured to extend in the second direction. The liquid crystal layer is held between the first substrate and the second substrate.

According to another embodiment, there is provided a liquid crystal display apparatus comprising: a first substrate, a second substrate, and a liquid crystal layer. The first substrate includes a gate wiring located in a display area and configured to extend in a first direction, a first interlayer film provided on the gate wiring, a source wiring configured to extend in a second direction orthogonal to the first direction on the first interlayer film in the display area, a second interlayer film provided on the source wiring, a primary pixel electrode configured to extend in the second direction on the second interlayer film in the display area, a secondary pixel electrode connected to the primary pixel electrode and configured to extend in the first direction; and a peripheral wiring provided in a H shape on the first interlayer film in a non-display area outside the display area. The second substrate includes a primary common electrode located in the display area, arranged parallel to the primary pixel electrode, and configured to extend in the second direction. The liquid crystal layer is held between the first substrate and the second substrate and includes a cell gap narrower than an interval between the primary pixel electrode and the primary common electrode.

A liquid crystal display apparatus according to an embodiment will be described in detail below with reference to the drawings. FIG. 1 is a diagram schematically showing a configuration of a liquid crystal display apparatus according to an embodiment and an equivalent circuit thereof.

As shown in FIG. 1, the liquid crystal display apparatus includes an active matrix type liquid crystal display panel LPN. The liquid crystal display panel LPN includes an array substrate AR as a first substrate, a countersubstrate CT as a second substrate arranged opposite to the array substrate AR, and a liquid crystal layer LQ held between the array substrate AR and the countersubstrate CT. The liquid crystal display panel LPN described above includes a display area ACT where images are displayed. In the display area ACT, m×n pixels PX arranged in a matrix shape are provided (m and n are positive integers).

The liquid crystal display panel LPN includes n gate wirings G (G1 to Gn), n auxiliary capacitance wirings C (C1 to Cn), and m source wirings S (S1 to Sm) and the like in the display area ACT. The gate wiring G and the auxiliary capacitance wiring C extend substantially linearly, for example, in a first direction X. The gate wirings G and the auxiliary capacitance wirings C are alternately arranged parallel to each other in a second direction Y crossing the first direction X. Here, the first direction X and the second direction Y are substantially orthogonal to each other. The source wiring S crosses the gate wiring G and the auxiliary capacitance wiring C. The source wiring S extends substantially linearly in the second direction Y. Incidentally, the gate wirings G, the auxiliary capacitance wirings C, and the source wiring S do not necessarily extend linearly and a portion thereof may be curved.

One end of each of the gate wirings G is pulled out of the display area ACT to be connected to a gate driver GD. One end of each of the source wirings S is pulled out of the display area ACT to be connected to a source driver SD. At least a portion of each of the gate driver GD and the source driver SD is connected to, for example, a drive IC chip 2. The drive IC chip 2 is formed on the array substrate AR and contains, for example, a controller.

Each of the pixels PX includes a switching element SW, a pixel electrode PE, and a common electrode CE and the like. The auxiliary capacitance wiring C is electrically connected to a voltage application unit VCS to which an auxiliary capacitance voltage is applied.

In the present embodiment, the liquid crystal display panel LPN is configured in such a way that while the pixel electrode PE is formed on the array substrate AR, at least a portion of the common electrodes CE is formed on the countersubstrate CT and an electric field produced between the pixel electrode PE and the common electrode CE is mainly used to switch liquid crystal molecules of the liquid crystal layer LQ. The electric field produced between the pixel electrode PE and the common electrode CE is an oblique electric field slightly inclined with respect to an X-Y plane defined by the first direction X and the second direction Y or the principal plane of the substrate (or a transverse electric field approximately parallel to the principal plane of the substrate).

The switching element SW is constituted of, for example, an n-channel thin-film transistor (TFT). The switching element SW is electrically connected to the gate wiring G and the source wiring S. The switching element SW may be of top gate type or bottom gate type. The switching element SW has a semiconductor layer formed of, for example, polysilicon, and the semiconductor layer may also be formed of amorphous silicon.

The pixel electrode PE is arranged in each pixel PX and is electrically connected to the switching element SW and an auxiliary capacitance element CS. The common electrode CE is arranged commonly to the pixel electrodes PE of a plurality of pixels PX via the liquid crystal layer LQ. The pixel electrode PE and the common electrode CE as described above are formed of a conductive material having light transmission properties such as indium tin oxide (ITO) and indium zinc oxide (IZO), but may also be formed of other metallic materials such as aluminum.

Figure 2:
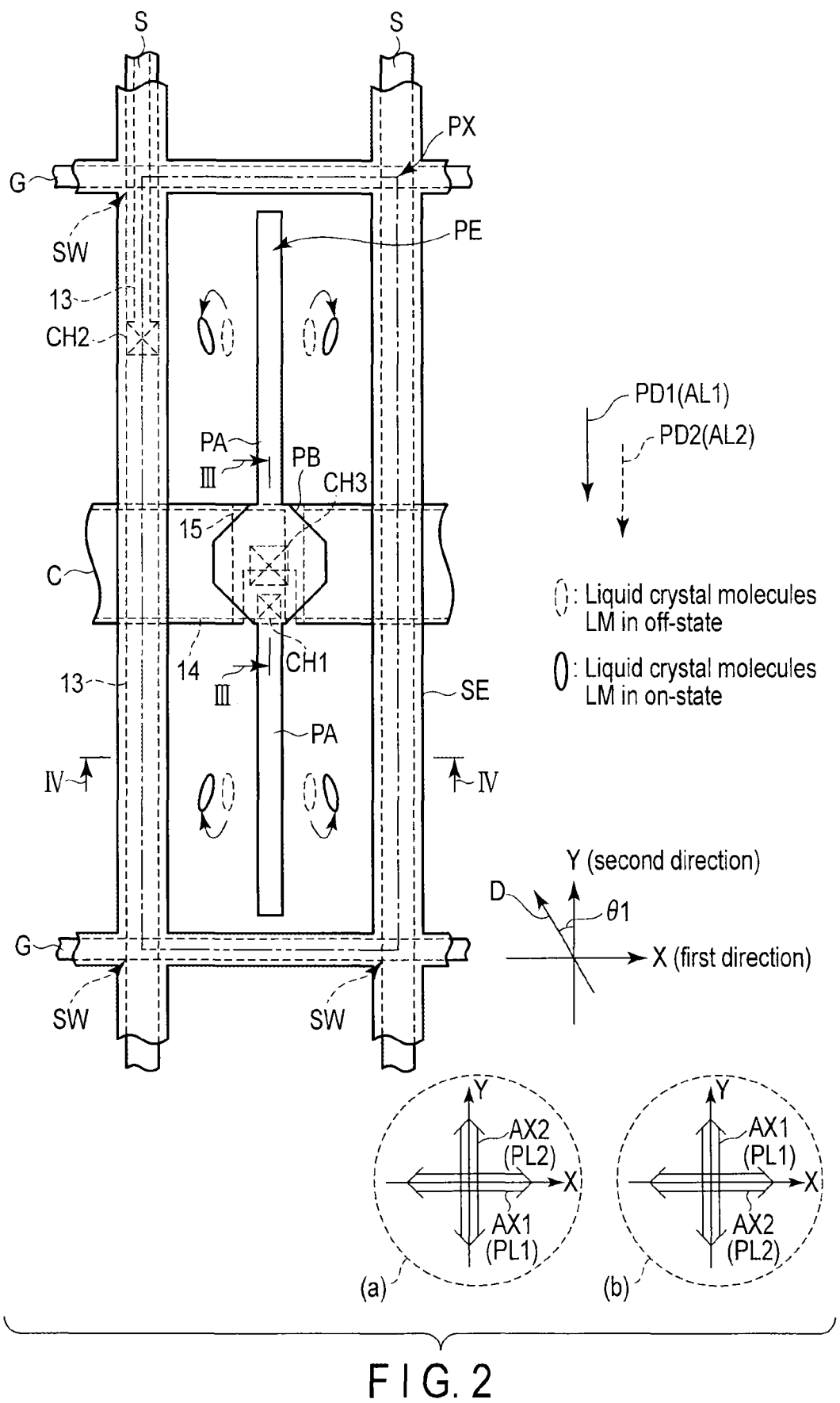
FIG. 2 is a plan view schematically showing a structure example of a pixel of an array substrate shown in FIG. 1.

FIG. 2 is a plan view schematically showing a structure example of one pixel PX of the array substrate AR shown in FIG. 1. Here, a plan view on the X-Y plane is shown.

As shown in FIG. 2, the pixel PX has, as indicated by a two-dot chain line, a rectangular shape in which the dimension in the first direction X is less than that in the second direction Y. The gate wiring G extends in the first direction X. The auxiliary capacitance wiring C is arranged between the adjacent gate wirings G and extends in the first direction X. The auxiliary capacitance wiring C is arranged in a substantially central portion of the pixel. The source wiring S extends in the second direction Y. The pixel electrode PE is arranged between the adjacent source wirings S. The pixel electrode PE is positioned between the gate wirings G.

The switching element SW is electrically connected to the gate wiring G and the source wiring S. The switching element SW is provided at the point of intersection of the gate wiring G and the source wiring S. A semiconductor layer 13 of the switching element SW is provided in a region overlapping with the source wiring S by hardly protruding out of the source wiring S and restricts the reduction of area of an opening contributing to the display.

Figure 3:
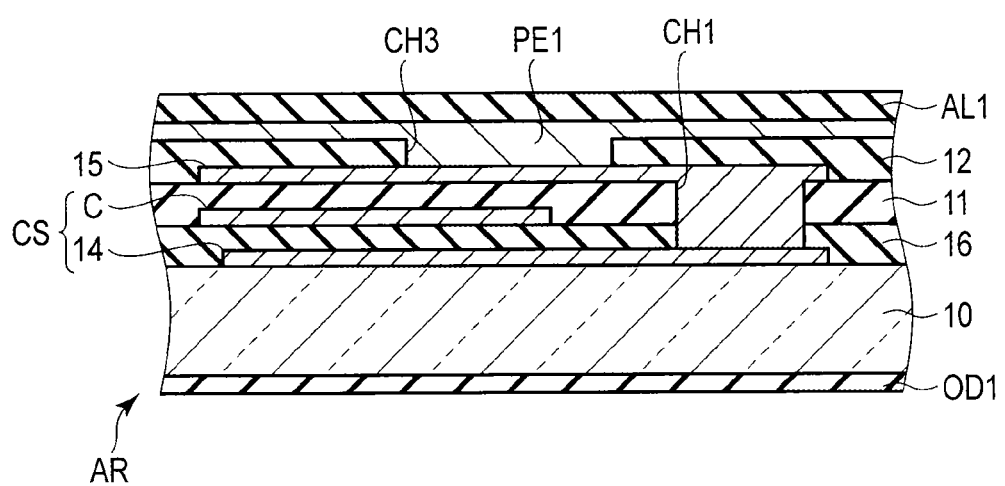
FIG. 3 is a sectional view schematically showing a structure example of the array substrate along line in FIG. 2.

FIG. 3 is a sectional view schematically showing a structure example of the array substrate AR along line in FIG. 2.

As shown in FIGS. 2 and 3, an auxiliary capacitance electrode 14 is provided on a first insulating substrate 10. The auxiliary capacitance electrode 14 is formed integrally with the semiconductor layer 13 using the same material. A gate insulating film 16 is provided on the first insulating substrate 10 and the auxiliary capacitance electrode 14, and the auxiliary capacitance wiring C and others are provided on the gate insulating film 16. The auxiliary capacitance electrode 14 and the auxiliary capacitance wiring C overlapping with each other form the auxiliary capacitance element CS. The auxiliary capacitance electrode 14 hardly protruding out of the auxiliary capacitance wiring C and restricts the reduction of area of an opening contributing to the display.

A first interlayer insulating 11 is provided on the gate insulating film 16 on which the auxiliary capacitance wiring C and others are formed. A connecting electrode 15 and the source wiring S are provided on the first interlayer insulating 11. The connecting electrode 15 and the source wiring S are formed of the same material such as aluminum (Al) at the same time. The connecting electrode 15 is connected to the auxiliary capacitance electrode 14 through a contact hole CH1 formed in the gate insulating film 16 and the first interlayer insulating 11. The source wiring S is connected to a source region of the semiconductor layer 13 through a contact hole CH2 formed in the gate insulating film 16 and the first interlayer insulating 11.

A second interlayer insulating 12 is provided on the first interlayer insulating 11, the connecting electrode 15, and the source wiring S. A shield electrode SE and the pixel electrode PE are formed on the second interlayer insulating 12.

As shown in FIG. 2, the shield electrode SE is opposed to the gate wiring G and the source wiring S and is formed in a lattice shape. The width of the shield electrode SE at a point opposite to the gate wiring G is greater than or equal to that of the gate wiring G, and the width of the shield electrode SE at a point opposite to the source wiring S is greater than or equal to that of the source wiring S.

The pixel electrode PE is positioned with an interval from the shield electrode SE and extends in the second direction Y. The pixel electrode PE includes a primary pixel electrode PA and a secondary pixel electrode PB electrically connected to each other.

The primary pixel electrode PA linearly extends in the second direction Y from the secondary pixel electrode PB to the vicinity of the upper-side end and the lower-side end of the pixel PX. The primary pixel electrode PA described above is formed in a band shape having substantially uniform width in the first direction X.

The secondary pixel electrode PB is positioned in a region overlapping with the auxiliary capacitance wiring C and is electrically connected to the connecting electrode 15 through a contact hole CH3 formed in the second interlayer insulating 12. The secondary pixel electrode PB is formed to be wider than the primary pixel electrode PA. In the present embodiment, the secondary pixel electrode PB is formed in an octagonal shape. The pixel electrode PE described above is arranged at a substantially intermediate position of the adjacent source wirings S, that is, in the center of the pixel PX.

Figure 4:
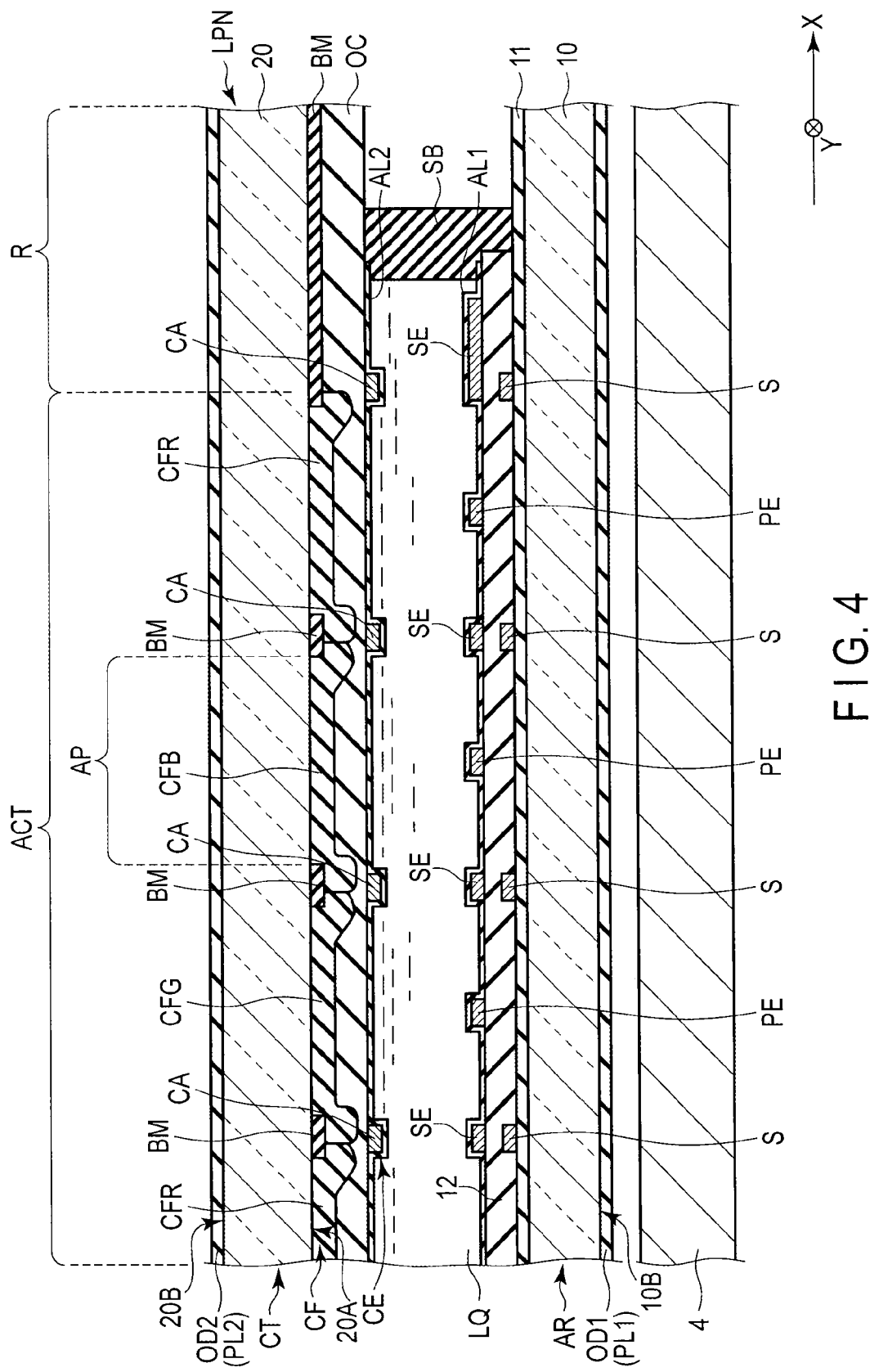
FIG. 4 is a sectional view schematically showing a structure when a liquid crystal display panel shown in FIG. 2 is cut along line IV-IV.

FIG. 4 is a sectional view schematically showing a structure when the liquid crystal display panel LPN shown in FIG. 2 is cut along line IV-IV. Here, only portions needed for description are shown.

As shown in FIGS. 2 and 4, the common electrode CE includes a primary common electrode CA. The primary common electrode CA linearly extends in the second direction Y substantially parallel to the primary pixel electrode PA. A pair of the primary common electrodes CA adjacent to each other is positioned across the primary pixel electrode PA in the first direction X. Alternatively, the primary common electrode CA is opposed to the respective source wiring S and extends substantially parallel to the primary pixel electrode PA. The primary common electrode CA described above is formed in a band shape having substantially uniform width in the first direction X.

In the illustrated example, the pair of the primary common electrodes CA is arranged in the first direction X and is arranged at the left and right ends of the pixel PX. A plurality of the primary common electrodes CA is electrically connected to each other in the display area ACT or a non-display area R outside the display area ACT.

If the positional relationship between the pixel electrode PE and the primary common electrode CA is focused on, it is clear that the pixel electrode PE and the primary common electrode CA are arranged alternately in the first direction X. The pixel electrode PE and the primary common electrode CA are arranged substantially parallel to each other. In this case, none of the primary common electrodes CA overlaps the pixel electrode PE on the X-Y plane.

As shown in FIG. 4, a backlight unit 4 is arranged on the rear side of the array substrate AR constituting the liquid crystal display panel LPN. Various forms of units can be applied as the backlight unit 4 and units using a light emitting diode (LED) or cold-cathode tube (CCFL) can be applied and here, a description of a detailed structure thereof is omitted.

The array substrate AR is formed using the first insulating substrate 10 having light transmission properties. The pixel electrode PE is positioned on the inner side of the position of each line of the adjacent source wirings S.

A first alignment film AL1 is arranged on the surface of the array substrate AR opposite to the countersubstrate CT and extends over substantially the entire display area ACT. The first alignment film AL1 covers the pixel electrode PE and others and is arranged also on the second interlayer insulating 12. The first alignment film AL1 described above is formed of a material showing horizontal alignment.

The countersubstrate CT is formed using a second insulating substrate 20 having light transmission properties. The countersubstrate CT includes a black matrix BM, a color filter CF, an overcoat layer OC, the common electrode CE, a second alignment film AL2, or the like.

The black matrix BM demarcates each pixel PX and forms an opening AP opposite to the pixel electrode PE. That is, the black matrix BM is arranged so as to be opposite to a wiring portion such as the source wiring S, gate wiring, auxiliary capacitance wiring, and switching element. Here, only a portion of the black matrix BM extending in the second direction Y is illustrated, but a portion extending in the first direction X may also be included. The black matrix BM is arranged on an inner surface 20A of the second insulating substrate 20 opposite to the array substrate AR.

The color filter CF is arranged corresponding to each pixel PX. That is, the color filter CF is arranged in the opening AP on the inner surface 20A of the second insulating substrate 20 and also a portion thereof is placed onto the black matrix BM. The color filters CF arranged in the pixels PX adjacent in the first direction X have mutually different colors. For example, the color filters CF are formed of resin materials each colored in one of the three primary colors, red, green, and blue. A red color filter CFR made of a resin material colored red is arranged corresponding to a red pixel. A blue color filter CFB made of a resin material colored blue is arranged corresponding to a blue pixel. A green color filter CFG made of a resin material colored green is arranged corresponding to a green pixel. The boundary of these color filters CF is in positions overlapping the black matrix BM.

The overcoat layer OC covers the color filter CF. The overcoat layer OC mitigates the influence of unevenness of the surface of the color filter CF.

The common electrode CE is provided on the side opposite to the array substrate AR of the overcoat layer OC.

The second alignment film AL2 is arranged on the surface opposite to the array substrate AR of the countersubstrate CT and extends over substantially the entire display area ACT. The second alignment film AL2 covers the common electrode CE, the overcoat layer OC and the like. The second alignment film AL2 described above is formed of a material showing horizontal alignment.

As shown in FIGS. 2 and 4, the first alignment film AL1 and the second alignment film AL2 are alignment-treated (such as rubbing and photo alignment treatment) for initial alignment of liquid crystal molecules of the liquid crystal layer LQ. A first alignment treatment direction PD1 for initial alignment of liquid crystal molecules by the first alignment film AL1 and a second alignment treatment direction PD2 for initial alignment of liquid crystal molecules by the second alignment film AL2 are mutually parallel and oriented in opposite directions or in the same direction. For example, the first alignment treatment direction PD1 and the second alignment treatment direction PD2 are, as shown in FIG. 2, substantially parallel to the second direction Y and oriented in the same direction.

The array substrate AR and the countersubstrate CT as described above are arranged in such a way that the first alignment film AL1 and the second alignment film AL2 are opposite to each other respectively. In this case, a predetermined cell gap, for example, a cell gap of 2 to 7 μm is formed by, for example, a columnar spacer formed of a resin material integrally with one substrate between the first alignment film AL1 of the array substrate AR and the second alignment film AL2 of the countersubstrate CT. The interval between the primary pixel electrode PA and the primary common electrode CA is wider than the cell gap. That is, the cell gap of the liquid crystal layer held between the array substrate AR and the countersubstrate CT is narrower than the interval between the primary pixel electrode PA and the primary common electrode CA. The array substrate AR and the countersubstrate CT are sealed together by a sealant SB outside the display area ACT while the predetermined cell gap is formed.

The liquid crystal layer LQ is formed in a space surrounded by the array substrate AR (first alignment film AL1), the countersubstrate CT (second alignment film AL2), and the sealant SB and is held between the array substrate AR and the countersubstrate CT. The liquid crystal layer LQ described above is constituted of, for example, a liquid crystal material whose dielectric anisotropy is positive (positive type).

A first optical element OD1 is sealed to the outside surface of the array substrate AR, that is, an outside surface 10B of the first insulating substrate 10 constituting the array substrate AR by using an adhesive or the like. The first optical element OD1 is positioned on the side opposite to the backlight unit 4 of the liquid crystal display panel LPN and controls the polarization state of incident light incident on the liquid crystal display panel LPN from the backlight unit 4. The first optical element OD1 contains a first polarizer PL1 having a first polarization axis (or a first absorption axis) AX1.

A second optical element OD2 is sealed to the outside surface of the countersubstrate CT, that is, an outside surface 20B of the second insulating substrate 20 constituting the countersubstrate CT using an adhesive or the like. The second optical element OD2 is positioned on the display surface side of the liquid crystal display panel LPN and controls the polarization state of emitted light emitted from the liquid crystal display panel LPN. The second optical element OD2 contains a second polarizer PL2 having a second polarization axis (or a second absorption axis) AX2.

The first polarization axis AX1 of the first polarizer PL1 and the second polarization axis AX2 of the second polarizer PL2 are, for example, in an orthogonal spatial relationship and thus, the first polarizer PL1 and the second polarizer PL2 are cross Nicol-arranged. In this case, one polarizer is arranged so that the polarization axis thereof is parallel or orthogonal to the initial alignment direction of liquid crystal molecules, that is, the first alignment treatment direction PD1 or the second alignment treatment direction PD2. If the initial alignment direction is parallel to the second direction Y, the polarization axis of one polarizer is parallel to the second direction Y or the first direction X.

In the example shown in (a) of FIG. 2, the first polarizer PL1 is arranged so that the first polarization axis AX1 thereof is orthogonal to the initial alignment direction (second direction Y) of liquid crystal molecules LM (that is, parallel to the first direction X), and the second polarizer PL2 is arranged so that the second polarization axis AX2 thereof is parallel to the initial alignment direction of the liquid crystal molecules LM (that is, parallel to the second direction Y).

In the example shown in (b) of FIG. 2, the second polarizer PL2 is arranged so that the second polarization axis AX2 thereof is orthogonal to the initial alignment direction (second direction Y) of the liquid crystal molecules LM (that is, parallel to the first direction X), and the first polarizer PL1 is arranged so that the first polarization axis AX1 thereof is parallel to the initial alignment direction of the liquid crystal molecules LM (that is, parallel to the second direction Y).

Next, the operation of the liquid crystal display panel LPN configured above will be described with reference to FIGS. 2 and 4.

As shown in FIGS. 2 and 4, the liquid crystal molecules LM of the liquid crystal layer LQ is aligned so that the major axis thereof is oriented toward the first alignment treatment direction PD1 of the first alignment film AL1 and the second alignment treatment direction PD2 of the second alignment film AL2 in a state in which no voltage is applied to the liquid crystal layer LQ, that is, no electric field is produced between the pixel electrode PE and the common electrode CE (during off-states). Such off-states correspond to the initial alignment state and the alignment direction of the liquid crystal molecules LM during off-states corresponds to the initial alignment direction.

To be more precise, the liquid crystal molecules LM are not necessarily aligned parallel to the X-Y plane and are frequently pre-tilted. Thus, the initial alignment direction of the liquid crystal molecules LM is a direction obtained by an orthogonal projection of the major axis of the liquid crystal molecules LM during off-states onto the X-Y plane. To simplify the description below, it is assumed that the liquid crystal molecules LM are aligned parallel to the X-Y plane and rotate in a plane parallel to the X-Y plane.

Here, both of the first alignment treatment direction PD1 and the second alignment treatment direction PD2 are substantially parallel to the second direction Y. The major axis of the liquid crystal molecules LM during off-states is initially aligned, as indicated by a dashed line in FIG. 2, substantially parallel to the second direction Y. That is, the initial alignment direction of the liquid crystal molecules LM is parallel to the second direction Y (or at 0° with respect to the second direction Y).

If, like the illustrated example, the first alignment treatment direction PD1 and the second alignment treatment direction PD2 are parallel and oriented in the same direction, the liquid crystal molecules LM are aligned substantially horizontally (the pre-tilt angle is substantially zero) near an intermediate portion of the liquid crystal layer LQ in the cross section of the liquid crystal layer LQ, and with this point as a boundary, the liquid crystal molecules LM are aligned with a pre-tilt angle so as to be symmetric in the vicinity of the first alignment film AL1 and the vicinity of the second alignment film AL2 (splay alignment).

As a result of aligning the first alignment film AL1 to the first alignment treatment direction PD1, the liquid crystal molecules LM near the first alignment film AL1 are initially aligned to the first alignment treatment direction PD1 and as a result of aligning the second alignment film AL2 to the second alignment treatment direction PD2, the liquid crystal molecules LM near the second alignment film AL2 are initially aligned to the second alignment treatment direction PD1. If the first alignment treatment direction PD1 and the second alignment treatment direction PD2 are parallel to each other and oriented in the same direction, as described above, the liquid crystal molecules LM are in a splay alignment and with the intermediate portion of the liquid crystal layer LQ as a boundary, as described above, the alignment of the liquid crystal molecules LM near the first alignment film AL1 on the array substrate AR and the alignment of the liquid crystal molecules LM near the second alignment film AL2 on the countersubstrate CT are symmetric with respect to a horizontal line. Thus, optical compensation is made also in a direction tilted from the normal direction of the substrate. Therefore, if the first alignment treatment direction PD1 and the second alignment treatment direction PD2 are parallel to each other and oriented in the same direction, light leakage in the black display is small so that it becomes possible to realize a high contrast ratio and to improve display quality.

If the first alignment treatment direction PD1 and the second alignment treatment direction PD2 are parallel to each other and oriented in opposite directions, the liquid crystal molecules LM are aligned with a substantially uniform pre-tilt angle near the first alignment film AL1, near the second alignment film AL2, and in the intermediate portion of the liquid crystal layer LQ in the cross section of the liquid crystal layer LQ (homogeneous alignment).

A portion of backlight from the backlight unit 4 passes through the first polarizer PL1 before entering the liquid crystal display panel LPN. The polarization state of the light that has entered the liquid crystal display panel LPN depends on the alignment state of the liquid crystal molecules LM when passing through the liquid crystal layer LQ. The light that has passed through the liquid crystal layer LQ during off-states is absorbed by the second polarizer PL2 (black display).

On the other hand, when a voltage is applied to the liquid crystal layer LQ, that is, an electric field is produced between the pixel electrode PE and the common electrode CE (during on-states), a transverse electric field (or an oblique electric field) substantially parallel to the substrate is produced between the pixel electrode PE and the common electrode CE. Under the influence of the electric field, the major axis of the liquid crystal molecules LM rotates, as indicated by a solid line in FIG. 2, in a plane substantially parallel to the X-Y plane.

In the example shown in FIG. 2, the liquid crystal molecules LM in an area between the pixel electrode PE and the primary common electrode CA on the left side rotate clockwise around the second direction Y and are oriented toward the lower left in FIG. 2. The liquid crystal molecules LM in an area between the pixel electrode PE and the primary common electrode CA on the right side rotate counterclockwise around the second direction Y and are oriented toward the lower right in FIG. 2.

Thus, in a state in which an electric field is produced between the pixel electrode PE and the common electrode CE in each pixel PX, the alignment direction of the liquid crystal molecules LM is divided into a plurality of directions with the pixel electrode PE acting as a boundary to form a domain in each alignment direction. That is, a plurality of domains is formed for each pixel PX.

A portion of backlight entering the liquid crystal display panel LPN from the backlight unit 4 during such on-states passes through the first polarizer PL1 followed by entering the liquid crystal display panel LPN. The backlight having entered the liquid crystal layer LQ changes in its polarization state. During such on-states, at least a portion of light having passed through the liquid crystal layer LQ passes through the second polarizer PL2 (white display).

Figure 5:
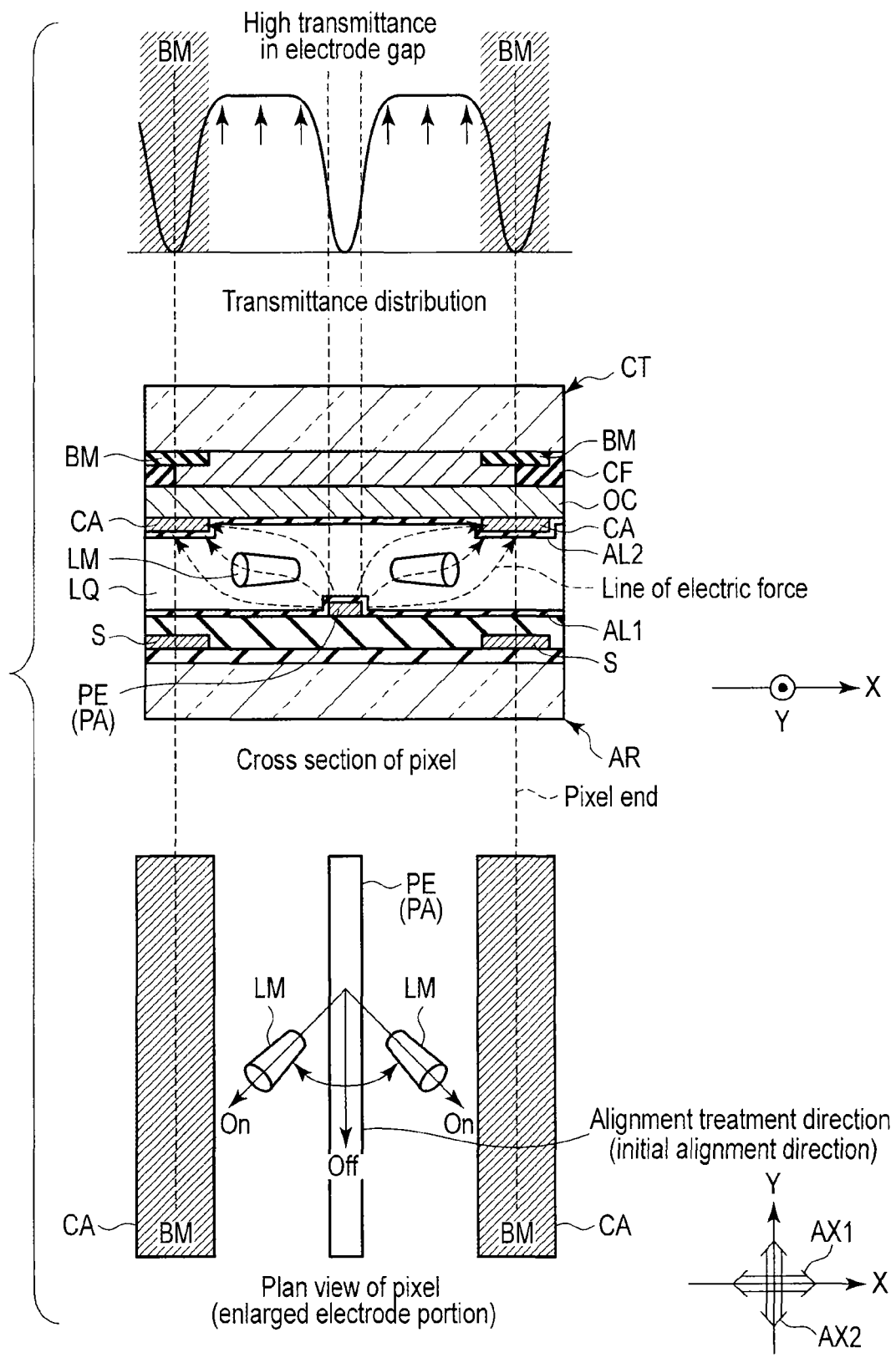
FIG. 5 is a diagram illustrating an electric field produced between a pixel electrode and a common electrode in the liquid crystal display panel shown in FIGS. 2 and 4 and a relationship between a director and transmittance of liquid crystal molecules by the electric field.

FIG. 5 is a diagram illustrating an electric field produced between the pixel electrode PE and the common electrode CE in the liquid crystal display panel LPN shown in FIGS. 2 and 4 and a relationship between a director of the liquid crystal molecules LM and transmittance by the electric field. Here, the description focuses on the pixel electrode PE (primary pixel electrode PA) and the common electrode CE (primary common electrode CA).

As shown in FIG. 5, the liquid crystal molecules LM are initially aligned substantially parallel to the second direction Y during off-states. During on-states in which a potential difference is produced between the pixel electrode PE and the common electrode CE, the optical modulation percentage of the liquid crystal is the highest (that is, the transmittance is the highest in an opening) when the director (or the major axis direction of the liquid crystal molecules LM) of the liquid crystal molecules LM is shifted by about 45° with respect to the first polarization axis AX1 of the first polarizer PL1 and the second polarization axis AX2 of the second polarizer PL2 in the X-Y plane.

In the illustrated example, when the pixel becomes on-state, the directors of the liquid crystal molecules LM between the primary common electrode CA on the left side and the pixel electrode PE are substantially parallel at azimuth angles 45°, −225° in the X-Y plane and the directors of the liquid crystal molecules LM between the primary common electrode CA on the right side and the pixel electrode PE are substantially parallel at azimuth angles 135°, −315° in the X-Y plane to achieve the peak transmittance. If the transmittance distribution per pixel is focused on, while the transmittance is substantially zero on the pixel electrode PE and the common electrode CE, a high transmittance is gained over substantially the entire area of the electrode gap between the pixel electrode PE and the common electrode CE.

The primary common electrode CA positioned just above the source wiring S is opposed to the black matrix BM and the primary common electrode CA has a width less than or equal to that of the black matrix BM in the first direction X and does not extend to the side of the pixel electrode PE from the position overlapping the black matrix BM. Thus, an opening contributing to the display per pixel corresponds to an area between the pixel electrode PE and a pair of the adjacent primary common electrodes CA of regions between the black matrixes BM or between a pair of the adjacent source wirings S.

Figure 6:
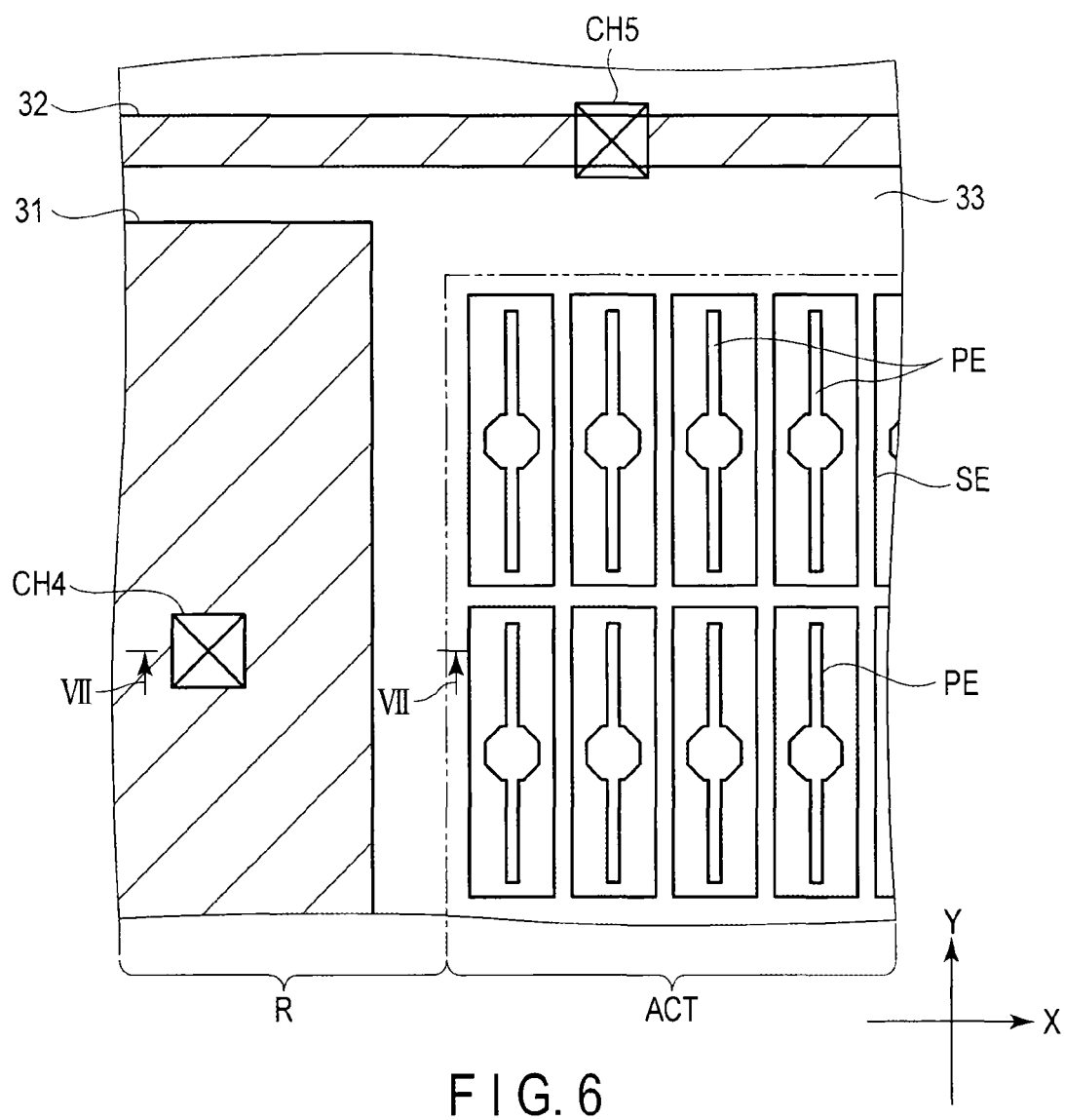
FIG. 6 is a plan view schematically showing a corner of a display area and a non-display area of the array substrate.
Figure 7:
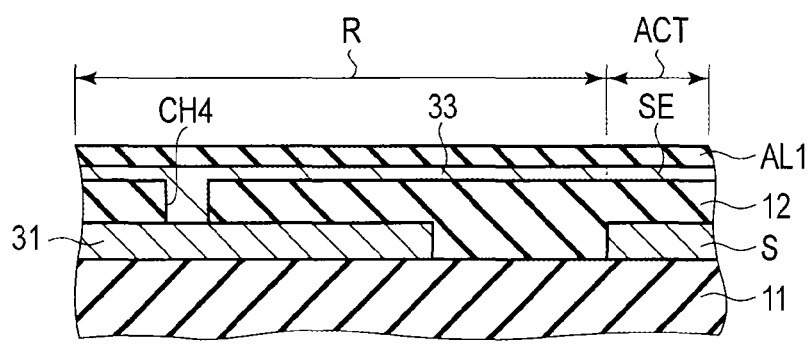
FIG. 7 is a sectional view schematically showing a structure example of the array substrate along line VII-VII in FIG. 6.

FIG. 6 is a plan view schematically showing a corner of the display area ACT and the non-display area R of the array substrate AR. FIG. 7 is a sectional view schematically showing a structure example of the array substrate AR along line VII-VII in FIG. 6.

As shown in FIGS. 6 and 7, the array substrate AR includes a peripheral wiring 31 located in the non-display area R, another peripheral wiring 32, and a peripheral connecting electrode 33. The peripheral wiring 31 and the peripheral wiring 32 are provided on the first interlayer insulating 11 of the same material together with the source wiring S or the like. A metallic material such as Al can be used as the above material. The peripheral wiring 32 is set to the same potential as the peripheral wiring 31.

The peripheral connecting electrode 33 is a solid electrode in a rectangular frame shape located in the non-display area R in a rectangular frame shape and is provided on the second interlayer insulating 12 of the same material together with the pixel electrode PE and the shield electrode SE. Here, the peripheral connecting electrode 33 is formed integrally with the shield electrode SE.

The peripheral connecting electrode 33 is connected to the peripheral wiring 31 through a contact hole CH4 formed in the second interlayer insulating 12 and connected to the peripheral wiring 32 through a contact hole CH5 formed in the second interlayer insulating 12. Thus, the peripheral connecting electrode 33 electrically connects the shield electrode SE and the peripheral wiring 31 and also the shield electrode SE and the peripheral wiring 32.

As shown in FIG. 1, the array substrate AR includes a feed unit VS to apply a voltage to the common electrode CE. The feed unit VS is formed, for example, in the non-display area R. A portion of the common electrode CE is pulled out to the non-display area R. Though not illustrated here, the liquid crystal display apparatus further includes a conductive member provided between the array substrate AR and the countersubstrate CT. A portion of the common electrode CE (FIG. 3) is electrically connected to the feed unit VS via the conductive member.

The array substrate AR further includes a voltage supply wiring located in the non-display area R, electrically connected to the common electrode CE (primary common electrode CA) via the conductive member, and capable of supplying a common voltage to the common electrode CE.

As shown in FIGS. 1, 6, and 7, the feed unit VS in the present embodiment is formed of a portion of the peripheral wiring 31. Thus, the peripheral wiring 31 and the voltage supply wiring are shared. In such a case, the peripheral wiring 31 can be called a common wiring (Vcom wiring).

Incidentally, the feed unit VS may also be formed of a portion of the peripheral wiring 32. Thus, the peripheral wiring 32 and the voltage supply wiring are shared. In such a case, the peripheral wiring 32 can be called a common wiring (Vcom wiring).

Figure 8:
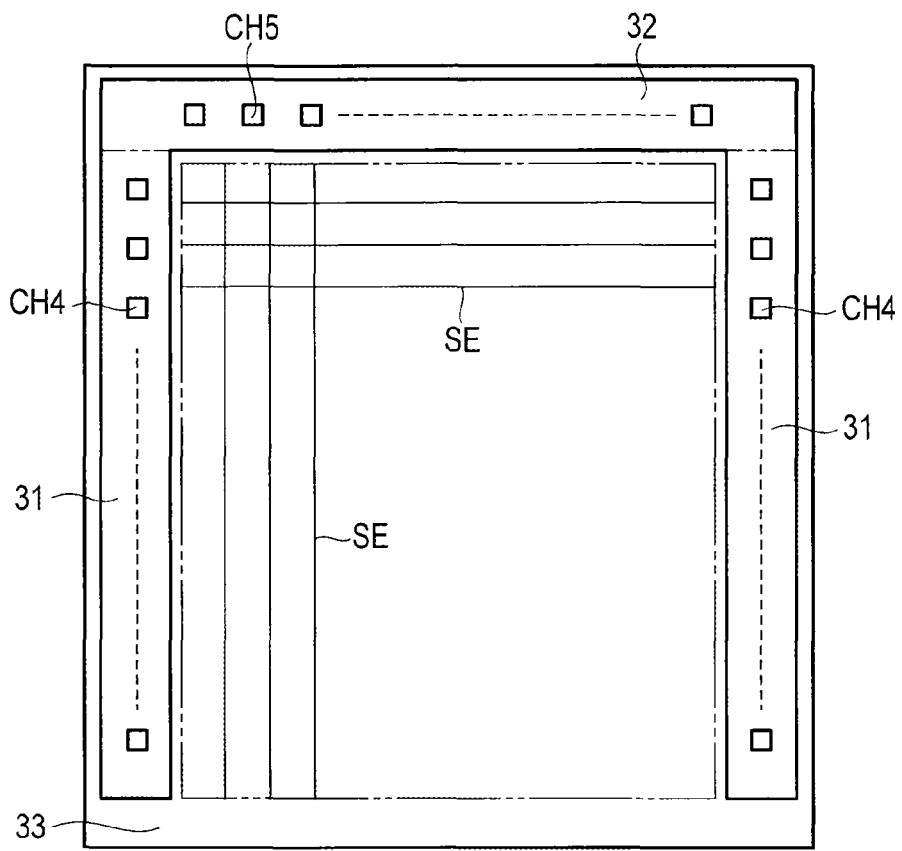
FIG. 8 is a plan view schematically showing entire peripheral connecting electrodes and peripheral wirings in the array substrate.

FIG. 8 is a schematic view showing the entire peripheral wirings 31, 32 located in the non-display area R of the array substrate AR.

As shown in FIG. 8, the peripheral wiring 31 is provided on the left and right sides of the display area ACT and the peripheral wiring 32 is provided on the side above or below the display area ACT on which there is no drive circuit. The peripheral wirings 31, 32 surround three sides of the display area ACT. In other words, peripheral wirings in the present embodiment are formed in an angular U shape or a Π shape excluding one edge side on which pads of outer lead bonding (OLB) are arranged. By arranging peripheral wirings in a 13 shape excluding one side of four sides in this manner, portions where the peripheral wirings intersect with wirings pulled out of the display area to the OLB pads are reduced so that yields are improved by preventing defects such as short circuits.

The shield electrode SE is connected, as described above, to both ends of the peripheral wiring 31 and the peripheral wiring 32 through contact holes CH4 and CH5 via the peripheral connecting electrode 33, but if the shield electrode SE and the peripheral connecting electrode 33 are connected by one side of the peripheral wirings 31, 32, the potential of the shield electrode SE becomes more unstable with an increasing distance from the connected location, generating concern that a sufficient shield effect may not be attained.

By connecting the shield electrode SE and the peripheral connecting electrode 33 by three side of the left and right sides of the peripheral wiring 31 and the upper side of the peripheral wiring 32 like in the present embodiment, a stable potential can be supplied to the shield electrode SE over the entire region of the display area ACT so that a sufficient shield effect can be attained. Further, with the peripheral connecting electrode 33 being arranged in a rectangular frame shape surrounding four sides of the display area ACT, a balanced potential can be supplied without generating a potential difference inside the shield electrode SE.

Each of the peripheral wirings 31, 32 may be interconnected, but may also be arranged independently. When the peripheral wirings 31, 32 are arranged independently, each peripheral wiring need only have the same potential applied thereto.

The peripheral connecting electrode 33 is arranged, as described above, like surrounding four sides of the display area ACT. The peripheral wirings are arranged in a lower layer of the peripheral connecting electrode 33 via a insulating film and on three sides of the display area ACT. Further, the peripheral connecting electrode and peripheral wirings are electrically connected through contact holes. By surrounding the display area ACT by the peripheral connecting electrode and peripheral wirings as described above, charges such as static electricity can be prevented from entering from outside to generate workings to protect wirings and circuits in the liquid crystal display apparatus.

According to a liquid crystal display apparatus configured as described above, the liquid crystal display apparatus includes the array substrate AR, the countersubstrate CT, and the liquid crystal layer LQ. The array substrate AR includes the gate wiring G, the source wiring S, the second interlayer insulating 12, the shield electrode SE, the primary pixel electrode PA, the peripheral wiring 31, and the peripheral connecting electrode 33. The shield electrode SE is provided on the second interlayer insulating 12 and opposed to the gate wiring G and the source wiring S. The peripheral wiring 31 is located in the non-display area R. The peripheral connecting electrode 33 electrically connects the shield electrode SE and the peripheral wiring 31.

Thus, the potential of the shield electrode SE can be set and the same potential as that of the primary common electrode CA can be applied to the shield electrode SE. Moreover, the above setting can be realized without increasing the manufacturing process or significantly changing the layout. Thus, undesired electric fields from the source wiring S and the gate wiring G can be shielded. Because the occurrence of light leakage caused by undesired movement of liquid crystal molecules can be reduced, degradation in display quality can be restricted.

From the above, a liquid crystal display apparatus superior in display quality can be obtained.

Further, according to the present embodiment, a high transmittance is gained in an electrode gap between the pixel electrode PE and the common electrode CE and therefore, the transmittance per pixel can be made sufficiently high by increasing the inter-electrode distance between the pixel electrode PE and the common electrode CA. Moreover, product specifications of different pixel pitches can be handled by changing the inter-electrode distance (that is, by changing the arrangement position of the primary common electrode CA with respect to the pixel electrode PE arranged in a substantial center of the pixel PX). That is, in a display mode according to the present embodiment, products of various pixel pitches can be provided by setting the inter-electrode distance without necessarily needing fine electrode workings ranging from product specifications of low resolution of a relatively large pixel pitch to product specifications of high resolution of a relatively small pixel pitch. Therefore, requirements of high transmittance and high resolution can easily be realized.

Further, according to the present embodiment, focusing on the transmittance distribution in an area overlapping the black matrix BM, it is found that the transmittance is sufficiently decreased. This is because no leakage of electric field to the outside of the pixel from the position of the common electrode CE occurs and no undesired transverse electric field is generated between adjacent pixels across the black matrix BM and thus, liquid crystal molecules in a region overlapping the black matrix BM maintain the initial alignment state like during off-states (or during a black display condition). Therefore, even if adjacent pixels have color filters in different colors, the occurrence of color mixing can be restricted so that lower color reproducibility and a lower contrast ratio can be restricted.

When displacements of the array substrate AR and the countersubstrate CT are caused, a difference of horizontal inter-electrode distances in the common electrodes CE on both sides across the pixel electrode PE may arise. However, such displacements arise for all the pixels PX in common and therefore, there is no difference in the distribution of electric field between the pixels PX and the influence thereof on the display of images is extremely small. Furthermore, even if displacements arise between the array substrate AR and the countersubstrate CT, undesired leakage of electric field to adjacent pixels can be restricted. Therefore, even if adjacent pixels have color filters of different colors, the occurrence of color mixing can be restricted so that lower color reproducibility and a lower contrast ratio can be restricted.

Further, according to the present embodiment, the primary common electrode CA is opposed to each source wiring S. Particularly when the primary common electrode CA is arranged just above the source wiring S, the opening AP is enlarged and so the transmittance of the pixel PX can be improved.

Also by arranging the primary common electrode CA just above the source wiring S, the inter-electrode distance between the pixel electrode PE and the primary common electrode CA can be increased so that a more horizontal transverse electric field can be produced. Therefore, a wider range of viewing angle as an advantage of the IPS mode and the like, which is a conventional configuration, can also be maintained.

Further, according to the present embodiment, a plurality of domains can be formed in a pixel. Therefore, the viewing angle can optically be compensated for in a plurality of directions so that the wider of viewing angle can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The shield electrode SE need only be opposed to at least a portion of the gate wiring G and the source wiring S. For example, the shield electrode SE need only be opposed to only the gate wiring G or only the source wiring S.

The peripheral connecting electrode 33 is connected to the peripheral wirings 31, 32 via contact holes CH4 and CH5 respectively, but the position, size and number of connection portions are not limited to the above example and various modifications thereof can be made. In this case, such modifications can be made by adjusting the arrangement, size, and shape of the peripheral connecting electrode 33 and the peripheral wirings 31, 32. For example, the peripheral connecting electrode 33 need only be electrically connected to the shield electrode SE and need not be a solid electrode.

The shield electrode SE need only be electrically connected to at least the peripheral wiring 31.

The peripheral connecting electrode 33 and the shield electrode SE may be, in addition to a transparent electrode such as ITO, an opaque conductive material such as aluminum, silver, and copper.

In the above example, a case when the initial alignment direction of the liquid crystal molecules LM is parallel to the second direction Y is described, but may be, as shown in FIG. 2, an oblique direction D obliquely crossing the second direction Y. An angle θ1 formed by the initial alignment direction D with the second direction Y is greater than 0° and less than 45°. From the perspective of alignment control of the liquid crystal molecules LM, it is very effective to set θ1 to about 5 to 30°, more desirably 20° or less. That is, the initial alignment direction of the liquid crystal molecules LM is desirably substantially within the range of 0 to 20° with respect to the second direction Y.

In the above example, a case when the liquid crystal layer LQ is constituted of a liquid crystal material whose dielectric anisotropy is positive (positive type) is described, but the liquid crystal layer LQ may also be constituted of a liquid crystal material whose dielectric anisotropy is negative (negative type). Though a detailed description is omitted, because the dielectric anisotropy is reversed between positive and negative, if the liquid crystal material is positive type liquid crystal material, it is preferable to set θ1 to 45 to 90°, desirably 70° or more.

Because a transverse electric field is hardly produced (or a sufficient electric field to drive the liquid crystal molecules LM is not produced) on the pixel electrode PE or the common electrode CE even during on-states, the liquid crystal molecules LM hardly move from the initial alignment direction like during off-states. Thus, even if the pixel electrode PE and the common electrode CE are formed of a conductive material having light transmission properties such as ITO, backlight hardly passes through such areas, making little contribution to the display during on-states. Therefore, the pixel electrode PE and the common electrode CE do not have to be formed of a transparent conductive material and may be formed using a conductive material such as aluminum, silver, and copper.

In the present embodiment, the structure of the pixel PX is not limited to the examples shown in FIGS. 2 and 4 and various modifications may be made. The pixel PX need only include, at least, one or more primary pixel electrode (PA) extending along the major axis of the pixel PX formed on the array substrate AR and a plurality of primary common electrodes (CA) extending in the major axis direction of the pixel PX formed on the countersubstrate CT and positioned across the primary pixel electrode in the minor axis direction of the pixel PX.

The shape of the pixel electrode PE can be changed in various ways and may have a cross shape, T shape, or I shape. For example, the pixel electrode PE can be formed in a cross shape by changing the shape of the secondary pixel electrode PB. In addition, the pixel electrode PE may have a V shape. In this case, the primary pixel electrode PA is not formed by linearly extending in the second direction Y, but is formed by bending in the center portion thereof.

The common electrode CE may contain, in addition to the primary common electrodes CA, a secondary common electrode formed on the counterelectrode CT and extending in the first direction X. The secondary common electrode is set to have the same potential as the primary common electrode CA. Because the shield electrode SE is also set to have the same potential as the primary common electrode CA, the shield electrode SE may also be called a secondary common electrode.

The primary common electrode CA and the secondary common electrode formed on the countersubstrate CT are formed integrally and successively. The secondary common electrode formed on the countersubstrate CT is opposed to each of the gate wirings G.

What is claimed is:

1. A display comprising:
an array substrate including a plurality of pixels formed in a display area, a plurality of source lines in the display area, a common electrode, a peripheral wiring connected to the common electrode, an interlayer film, a plurality of pads of an outer lead bonding, and an alignment film,
wherein
the array substrate includes a first side, a second side opposed to the first side in a first direction, a third side, and a fourth side opposed to the third side in a second direction intersecting the first direction,
the pads of the outer lead bonding is between the fourth side and the display area,
the common electrode extends from the display area to the first to fourth sides,
the peripheral wiring surrounds the display area excluding one side between the display area and the pads of outer lead bonding,
the peripheral wiring includes a first peripheral wiring, a second peripheral wiring, and a third peripheral wiring,
the first peripheral wiring is between the third side and the display area,
the second peripheral wiring is between the first side and the display area,
the third peripheral wiring is between the second side and the display area,
the interlayer film includes contact holes,
the first peripheral wiring, the second peripheral wiring, and the third peripheral wiring are provided in a same material as the source lines,
the interlayer film includes a top surface and a bottom surface opposed to the top surface,
the bottom surface is in contact with the first peripheral wiring, the second peripheral wiring, the third peripheral wiring, and the source lines,
the common electrode is in contact with the top surface, and is covered by the alignment film,
the first peripheral wiring, the second peripheral wiring, and the third peripheral wiring are electrically connected to the common electrode through the contact holes,
the first peripheral wiring and the second peripheral wiring are discontinuous from each other, and
the second peripheral wiring does not overlap the first peripheral wiring.

2. The display according to claim 1, wherein
an end of the second peripheral wiring faces a part of the first peripheral wiring in the second direction, and is separated from the first peripheral wiring in the second direction, and
the part of the first peripheral wiring faces the end of the second peripheral wiring in the second direction, and is separated from the second peripheral wiring in the second direction.

3. The display according to claim 2, wherein
the common electrode overlaps the first peripheral wiring and the second peripheral wiring, and
the contact holes overlap the first peripheral wiring and the second peripheral wiring.

4. The display according to claim 3, wherein
the first peripheral wiring and the second peripheral wiring are not in direct contact with each other but are electrically connected to each other by the common electrode.

5. The display according to claim 3, wherein
the alignment film is in contact with the common electrode and overlaps the first peripheral wiring.

6. The display according to claim 5, wherein
the plurality of pixels include a plurality of pixel electrodes in the display area, and
the alignment film is in contact with the plurality of pixel electrodes in the display area.

7. The display according to claim 6, further comprising:
a plurality of gate lines arrayed in the first direction; and
a plurality of source lines arrayed in the second direction, wherein
the common electrode overlaps the gate lines and the source lines in the display area.

8. The display according to claim 6, wherein
the alignment film is in contact with the common electrode in the display area.

9. The display according to claim 1,
wherein
the third peripheral wiring is electrically connected to the common electrode,
the first to third peripheral wirings are discontinuous from each other, and
the third peripheral wiring and the second peripheral wiring are electrically connected by the common electrode.

10. The display according to claim 9, wherein
the common electrode overlaps the first to third peripheral wirings.

11. The display according to claim 10, wherein
the common electrode between the display area and the first to fourth sides surround four sides of the display area,
the first peripheral wiring is formed along the third side,
the second peripheral wiring is formed along the first side,
the third peripheral wiring is formed along the second side, and
the first to third peripheral wirings surround three sides of the display area.

12. The display according to claim 11, wherein
the first to third peripheral wirings are supplied with a common voltage.

13. The display according to claim 1, wherein
a width of the first peripheral wiring is smaller than a width of the second peripheral wiring.

14. The display according to claim 1, further comprising:
a counter substrate opposed to the array substrate,
wherein
the counter substrate includes a counter electrode, and
the counter electrode overlaps the common electrode in the display area.

15. The display of claim 14, wherein
the common electrode has a lattice shape in the display area,
the counter electrode includes a plurality of linear portions, and each of the plurality of linear portions extends parallel to respective one of the source lines.

16. The display according to claim 15, wherein the plurality of pixels include a plurality of pixel electrodes in the display area, the plurality of pixel electrodes and the plurality of linear portions extend in the second direction, and are arranged alternately in the first direction.

\* \* \* \* \*